US012640441B2

(12) United States Patent
Okano

(10) Patent No.: US 12,640,441 B2
(45) Date of Patent: May 26, 2026

(54) LITHIUM SECONDARY BATTERY

(71) Applicant: Panasonic Intellectual Property Management Co., Ltd., Osaka (JP)

(72) Inventor: Tetsuyuki Okano, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 574 days.

(21) Appl. No.: 18/023,514

(22) PCT Filed: Aug. 24, 2021

(86) PCT No.: PCT/JP2021/030980
§ 371 (c)(1),
(2) Date: Feb. 27, 2023

(87) PCT Pub. No.: WO2022/045127
PCT Pub. Date: Mar. 3, 2022

(65) Prior Publication Data
US 2023/0361431 A1     Nov. 9, 2023

(30) Foreign Application Priority Data
Aug. 31, 2020     (JP) ................................. 2020-146274

(51) Int. Cl.
*H01M 50/491*     (2021.01)
*H01M 10/052*     (2010.01)
(Continued)

(52) U.S. Cl.
CPC ....... *H01M 50/491* (2021.01); *H01M 10/052* (2013.01); *H01M 50/46* (2021.01); *H01M 50/471* (2021.01); *H01M 50/486* (2021.01)

(58) Field of Classification Search
None
See application file for complete search history.

(56) References Cited

U.S. PATENT DOCUMENTS

2005/0244716 A1     11/2005   Ogawa et al.
2013/0059192 A1      3/2013   Kajita et al.
(Continued)

FOREIGN PATENT DOCUMENTS

CN          103155215 A      6/2013
CN          107724140 A      2/2018
(Continued)

OTHER PUBLICATIONS

WO-2019009017-A1 English machine translation (Year: 2019).*
(Continued)

*Primary Examiner* — Scott J. Chmielecki
(74) *Attorney, Agent, or Firm* — WHDA, LLP

(57)          ABSTRACT
A lithium secondary battery includes a positive electrode, a negative electrode, and a porous separator disposed between the positive electrode and the negative electrode, a spacer disposed between the separator and at least one of the positive electrode and the negative electrode, and a non-aqueous electrolyte having lithium ion conductivity. In the negative electrode, the lithium metal deposits during charging, and the lithium metal dissolves during discharging. In a region where the negative electrode and the positive electrode face each other, a first region (R1) facing the spacer and a second region (R2) not facing the spacer are included. The spacer is nonporous or porous, and the spacer has a height (t) of 20 μm or more. When the spacer is porous, the spacer has a porosity Psp, the porosity Psp of the spacer being equal to or less than a porosity Pse the separator.

3 Claims, 5 Drawing Sheets

(51) Int. Cl.
  H01M 50/46 (2021.01)
  H01M 50/471 (2021.01)
  H01M 50/486 (2021.01)

(56) References Cited

U.S. PATENT DOCUMENTS

| | | | |
|---|---|---|---|
| 2013/0216893 A1 | 8/2013 | Ueki et al. | |
| 2016/0043370 A1 | 2/2016 | Hatta et al. | |
| 2021/0265617 A1 | 8/2021 | Okano et al. | |
| 2022/0140401 A1* | 5/2022 | Kim | H01M 10/4285 |
| | | | 429/129 |

FOREIGN PATENT DOCUMENTS

| | | | |
|---|---|---|---|
| JP | 10-12279 A | 1/1998 | |
| JP | 2005-293950 A | 10/2005 | |
| JP | 2009-081105 A | 4/2009 | |

| | | | | | |
|---|---|---|---|---|---|
| JP | 2011-8929 A | 1/2011 | | | |
| JP | 2013-137984 A | 7/2013 | | | |
| WO | 2014/148036 A1 | 9/2014 | | | |
| WO | WO-2019009017 A1 * | 1/2019 | ......... | H01M 50/409 | |
| WO | 2020/066254 A1 | 4/2020 | | | |

OTHER PUBLICATIONS

International Search Report dated Nov. 9, 2021, issued in counterpart International Application No. PCT/JP2021/030980 (2 pages).
Examination Report dated Jul. 31, 2023, issued in counterpart IN application No. 202347013727, with English translation. (6 pages).
Office Action dated Jun. 4, 2025, issued in counterpart CN Application No. 202180051083.5, with partial English translation. (9 pages).
Office Action dated Aug. 19, 2025, issued in counterpart JP Application No. 2022-544622.(4 pages).

* cited by examiner

LITHIUM SECONDARY BATTERY

CROSS-REFERENCE TO RELATED APPLICATION

This application is a National Phase Application filed under 35 U.S.C. § 371 of International Application No. PCT/JP2021/030980 filed on Aug. 24, 2021 which claims the benefit of priority under 35 U.S.C. § 119(a) of Japanese Patent Application No. 2020-146274 filed in Japan on Aug. 31, 2020, the contents of which are incorporated herein by reference.

TECHNICAL FIELD

The present disclosure relates to lithium secondary batteries.

BACKGROUND ART

As a high capacity non-aqueous electrolyte secondary battery, lithium ion batteries are known. The lithium ion battery can have a high capacity by using, as a negative electrode active material, for example, graphite and an alloy active material such as a silicon compound in combination. However, the room for improvement in terms of achieving a high capacity in lithium ion batteries is reaching a limit.

As a high capacity non-aqueous electrolyte secondary battery better than lithium ion batteries, lithium secondary batteries (lithium metal secondary batteries) are promising. In lithium secondary batteries, lithium metal deposits in the negative electrode during charging, and lithium metal dissolves during discharging and released as lithium ions in the non-aqueous electrolyte.

Patent Literature 1 has proposed a separator for a non-aqueous electrolyte battery: the separator includes a substrate composed of a porous film, and a porous surface layer formed on at least one face of the above-described substrate, containing particles and a resin material, and having bumps and dips with an arithmetic average roughness Sa of 1.0 μm or more and 4.0 μm or less.

Patent Literature 2 has proposed an electrode group for a non-aqueous secondary battery: the electrode group includes a positive electrode plate, a negative electrode plate, and a porous insulator interposed therebetween to be wound into a spiral or layered and made into a serpentine structure. The positive electrode plate includes a positive electrode current collector and a positive electrode mixture layer formed by applying a positive electrode mixture coating material applied onto the positive electrode current collector, the positive electrode mixture coating material prepared by kneading and dispersing an active material composed of at least lithium-containing composite oxide, and a conductive material, and a binder in a dispersion medium. The negative electrode plate includes a negative electrode current collector and a negative electrode mixture layer formed by applying a negative electrode mixture coating material onto the negative electrode current collector, the negative electrode mixture coating material prepared by kneading and dispersing an active material composed of at least a material capable of holding lithium, and a binder with a dispersion medium. A spacer composed of a resin is disposed at least one of the following: between the positive electrode plate and the porous insulator, and between the negative electrode plate and the porous insulator: the spacer is softened with a non-aqueous electrolyte and relieves stresses on the electrode plates caused by expansion and contraction during charging and discharging.

CITATION LIST

Patent Literature

PLT1: Japanese Laid-Open Patent Publication No. 2013-137984

PLT2: Japanese Laid-Open Patent Publication No. 2011-8929

SUMMARY OF INVENTION

In lithium secondary batteries, lithium metal deposits during charging and lithium metal dissolves during discharging in the negative electrode, and therefore the negative electrode goes through significant volume changes. Therefore, electrode fracture and electrode buckling may easily occur.

To cope with this, when the proposal of Patent Literature 1 is applied to lithium secondary batteries, as charge/discharge cycles progress, lithium metal deposition at the bump portions increases, and damages the negative electrode or positive electrode to reduce the capacity.

When the proposal of Patent Literature 2 is applied to lithium secondary batteries, as charge/discharge cycles progress, relieving of the expansion and contraction by the resin spacer becomes difficult, distortion is concentrated around the spacer, and damages to the negative electrode or positive electrode decreased the capacity greatly.

An aspect of the present disclosure relates to a lithium secondary battery including a positive electrode, a negative electrode, a porous separator disposed between the positive electrode and the negative electrode, a spacer disposed between the separator and at least one of the positive electrode and the negative electrode, and a non-aqueous electrolyte having lithium ion conductivity, wherein in the negative electrode, lithium metal deposits during charging, and the lithium metal dissolves during discharging, a first region facing the spacer and a second region not facing the spacer are included in a region where the negative electrode and the positive electrode face each other, the spacer is nonporous or porous, the spacer has a height of 20 μm or more, when the spacer is porous, the spacer has a porosity Psp, the porosity of the spacer being equal to or less than a porosity Pse of the separator.

The present disclosure suppresses electrode fracture and electrode buckling in lithium secondary batteries, allowing improvement in cycle characteristics.

DESCRIPTION OF EMBODIMENTS

Figure 1:
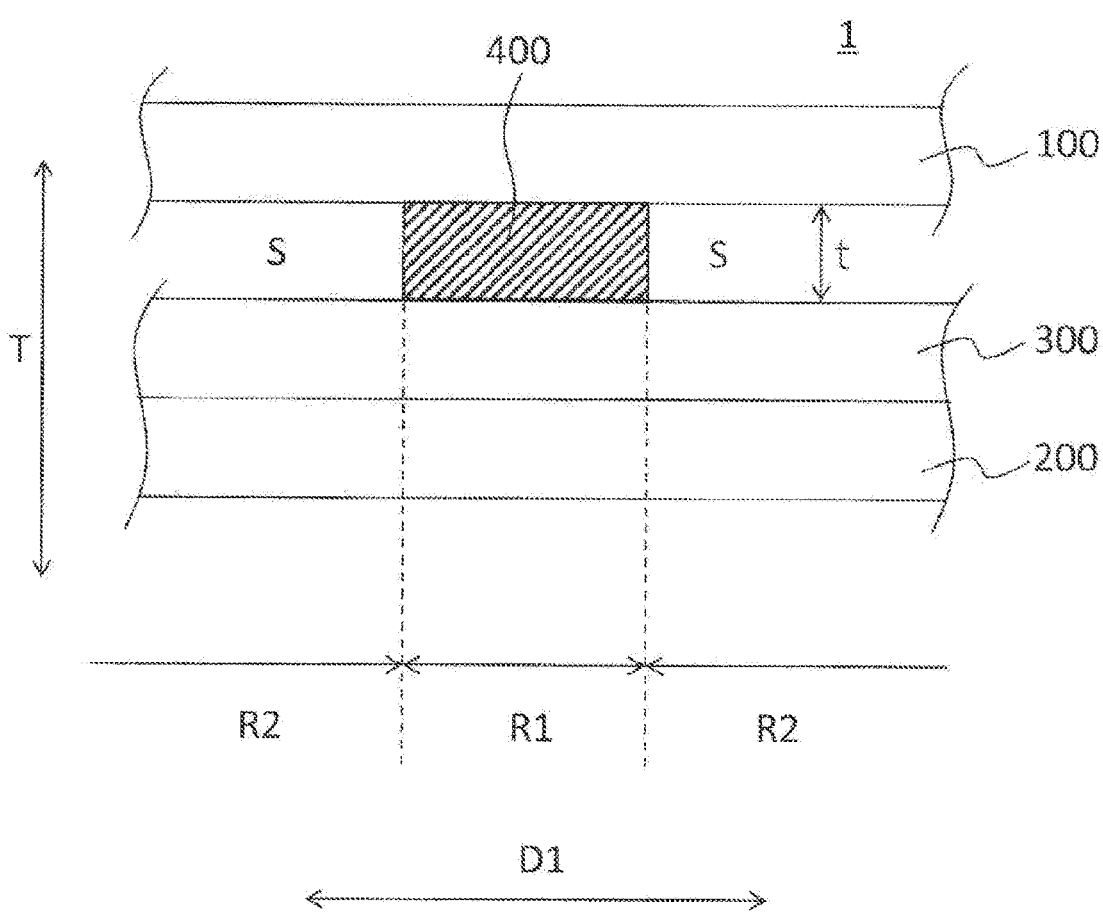
FIG. 1 is a cross sectional view schematically showing an important portion of an electrode group of a lithium secondary battery of an embodiment of the present disclosure.

A lithium secondary battery of the present disclosure includes a positive electrode, a negative electrode, a porous separator disposed between the positive electrode and the negative electrode, a spacer disposed between the separator and at least one of the positive electrode and the negative electrode (hereinafter, may be referred to generally as electrodes), and a non-aqueous electrolyte having lithium ion conductivity. In the negative electrode, lithium metal deposits during charging, and the lithium metal dissolves during discharging. Specifically, the negative electrode has at least a negative electrode current collector, and lithium metal deposits on the negative electrode current collector. The lithium secondary battery of the present disclosure is also referred to as a lithium metal secondary battery.

In lithium (metal) secondary batteries, for example, 70% or more of the rated capacity is brought out by deposition and dissolution of lithium metal. The electron migration during charging and during discharging in the negative electrode is mainly due to lithium metal deposition and dissolution in the negative electrode. Specifically, 70 to 100% (e.g., 80 to 100% or 90 to 100%) of the electron (in another aspect, electric current) migration in the negative electrode during charging and during discharging is due to lithium metal deposition and dissolution. That is, the negative electrode of this embodiment is different from the negative electrode in which the electron migration during charging and during discharging in the negative electrode is mainly due to lithium ion storage and release mainly in the negative electrode active material (graphite, etc.).

A region where the negative electrode and the positive electrode face each other includes a first region facing the spacer, and a second region not facing the spacer. The spacer is nonporous or porous, and when the spacer is porous, the spacer has a porosity Psp of equal to or less than the separator porosity Pse. Thus, during charging, lithium metal deposits with priority to the second region of the negative electrode not facing the spacer. Meanwhile, in the first region of the negative electrode facing the spacer, the deposition of lithium metal is suppressed. As a result, concentration of stress in the first region is reduced, and electrode fracture and electrode buckling are suppressed. Thus, cycle characteristics are improved.

In other words, when the spacer is porous, the ratio R of the spacer porosity Psp to the separator porosity Pse (that is, Psp/Pse) satisfies $0<R<1$. When the spacer is nonporous, $R=0$.

R (Psp/Pse ratio) may satisfy $0<R<0.75$, or satisfy $0<R<0.3$. The spacer is preferably formed of a porous material that allows the permeation of lithium ions, not a material that does not allow permeation of lithium ions at all. This easily allows for the suppression of the liquid-electrolyte deficiency at the positive electrode portion facing the separator. The porous material has flexibility and elasticity, and works to relieve stress by contraction when the negative electrode goes through volume expansion along with charging. In this manner, electrode damages and buckling can be prevented even more effectively. When the spacer has a low height, not only there is a smaller space for relieving stress, but the contraction amount per unit height increases, and therefore the spacer height may not recover easily.

The spacer has a height of 20 μm or more, and it may be 25 μm or more, or 30 μm or more. The spacer height means the maximum size of a spacer in the separator's thickness direction (hereinafter, also referred to as direction T). The spacer height can be determined by photographing cross sections of the spacer in the direction T using a scanning electron microscope (SEM), and the height is measured at any 10 points, and averaging them. The upper limit of the spacer height is not particularly limited, and for example, it is 100 μm or less, may be 80 μm or less, or 60 μm or less. These upper limits and lower limits can be combined arbitrarily.

Conventionally, when the spacer height is made large as described above (e.g., 20 μm or more), it is considered to be difficult to excellently suppress the deposition status of lithium metal. This is because a larger spacer height has less limitation on the growth direction of lithium ion, which allows dendritic lithium metal growth.

However, in reality, a smaller spacer height means a smaller accommodation space for lithium metal, and a corresponding amount of lithium metal deposits also around the spacer. Particularly, in the second region not facing the spacer, at the boundary portion with the first region facing the spacer, lithium metal deposition tends to be significant. As a result, the stress caused by the volume change of the negative electrode is concentrated around the spacer, which may easily cause electrode fracture and electrode buckling. When the Psp/Pse ratio R is less than 1 (furthermore less than 0.75 (particularly less than 0.3), and the spacer does not easily allow permeation of liquid-electrolytes, by increasing the spacer height, lithium metal deposition at the interface portion of the first region and the second region is suppressed. When the spacer height is sufficiently large, the accommodation space for the lithium metal is sufficiently ensured in the second region, and therefore it is considered that the lithium metal deposition at the interface region of the first region and the second region is suppressed.

Furthermore, starting points of the lithium metal deposition are not easily formed on the first region facing the spacer, and formed more in the second region with priority. Thus, compared with the case where lithium metal deposits on the entire first region and second region, lithium metal deposition portions are limited, and partial lithium metal isolation is not easily caused. In this case, the spacer height is large preferably, to ensure a space to which lithium metal can deposit in the direction T. In this manner, lithium metal deposition in the direction T is accelerated, avoiding further isolation of lithium metal.

When the spacer is porous, the larger the spacer height, the higher the possibility for lithium ions to go inside micropores of the spacer, and the larger the amount of lithium ions that can deposit to the first region. When a corresponding amount of lithium metal deposits in the first region, in the end, the stress caused by the negative electrode volume change is concentrated on the first region, and electrode fracture and electrode buckling may be caused easily. Thus, when the spacer height is large, it is preferable to make the Psp/Pse ratio R to small, to increase the resistance to lithium ion permeation inside the spacer.

As described above, in lithium secondary batteries, to suppress the electrode fracture and electrode buckling, and improve cycle characteristics, it is important to control the Psp/Pse ratio R and the spacer height in good balance.

The ratio of the first region area relative to a total area of the first region and the second region is not particularly limited, but in terms of balance between cycle characteristics and internal resistance, for example, it is 5% or more and 30% or less, or 5% or more and 20% or less. The larger the above-described first region area ratio, the more the deposition amount of lithium metal per unit area in the second region. Thus, deposition of lithium metal in the direction T is accelerated, and isolated lithium metal can be easily reduced. Furthermore, by controlling the above-described ratio of the first region area within the above-described range, the separator can give more uniform pressing force to the entire deposited lithium metal. Furthermore, the resistance to electrode reaction can be made small.

The first region facing the spacer is disposed to spread on the negative electrode uniformly as much as possible. In this manner, while suppressing the increase in the internal resistance, partially increased deposition of lithium metal can be decreased, and isolated lithium metal can be limited to a small amount as much as possible. Usually, the positive electrode and the negative electrode are strips having a long side and a short side. When circle regions are arbitrarily provided on the negative electrode surface, setting a short side direction length (width) L of the strip negative electrode, the circle region having a L/3 diameter, it is preferable that such circle regions always have a first region and a second region.

The spacer may be a composite including a resin material and particles. In this case, a porous spacer can be easily made. Also, the spacer porosity can be controlled easily. The particles may be inorganic particles, or organic particles.

<Spacer Porosity Psp Measurement>

The spacer porosity Psp can be determined by photographing the cross section of the spacer in the direction T with a scanning electron microscope (SEM) in the field of, for example, $2000 \, \mu m \times 100 \, \mu m$, image processing the photographed image by, for example, binarization, distinguishing micropore portion A and non-micropore portion B, and determining as an area ratio of portion A relative to a total area of portion A and portion B. The images for measurement are chosen from any 10 points, and preferably, the spacer porosity Psp (vol %) is determined as an average value of the area ratio of the above-described portion A of 10 points.

<Separator Porosity Pse Measurement>

The separator porosity Pse is measured, for example, by cutting out the separator into a predetermined area, and measuring its mass. The volume is calculated from the area×thickness. The volume is divided by the mass to calculate an apparent density (Va). The porosity is calculated from the apparent density and the true density of the separator component materials (density when porosity is 0%: Vr) ($Pse = 100 \times (1 - Va/Vr)$). When the separator is a multi-layer structure, by determining the thickness of each layer with a scanning electron microscope (SEM), the volume ratio of each layer is calculated, and the average true density Vre can be calculated from the true density and volume percentage of the component materials of each layer. The porosity is calculated in the same manner from the apparent density and the average true density Vre ($Pse = 100 \times (1 - Va/Vre)$).

The separator thickness is determined by measuring at any 10 points of the sample, while no load is applied to the separator in the direction T, and averaging them.

Preferably, the separator porosity Pse is, in view of securing sufficient ion permeability and mechanical strength, 25% or more and 70% or less, or 40% or more and 50% or less.

FIG. 1 schematically shows an important portion of an electrode group of a lithium secondary battery in an embodiment. An electrode group 1 includes a first electrode 100, a second electrode 200, a separator 300 disposed between the first electrode 100 and the second electrode 200, and a spacer 400 disposed between the first electrode 100 and the separator 300. One of the first electrode 100 and the second electrode 200 is a positive electrode, and the other is a negative electrode. A region where the first electrode 100 (second electrode 200) faces the second electrode (first electrode 100) is divided into a first region R1 facing the spacer 400, and a second region R2 not facing the spacer 400. The spacer 400 has a height t, which is a size of the spacer 400 in the thickness direction T of the separator 300.

[Spacer]

The spacer 400 provided between the electrodes 100 and 200 and the separator 300 forms a space S that accommodates lithium metal to be deposited, and decreases the volume change of the negative electrode involved with lithium metal deposition.

The separator 300 usually has a strip form having a long side and a short side. Here, the direction along the separator short side is D1. In cross sections parallel to the direction T and also parallel to the direction D1 of the spacer (hereinafter, referred to as reference line), a contact length between the separator 300 and the electrodes 100 and 200 and the spacer 400 (first region R1 width) is not particularly limited, and for example, 500 μm or more and 2000 μm or less. When the contact length is in this range, the stress applied to the spacer 400 tends to uniformly spread into the separator 300 and electrodes 100 and 200. Also, the first region R1 facing the spacer 400 is disposed to face the electrodes 100 and 200 to spread uniformly. The contact length is an average value of the contact lengths at different 5 reference lines.

The shape of the spacer 400 at the reference line is not particularly limited. The shape of the spacer at the reference line is, for example, rectangular, rectangular with at least one corner curved, trapezoid, ellipse, partially ellipse, or a shape similar to these.

The material forming the spacer 400 is not particularly limited. The spacer 400 is composed of a nonporous material and/or porous material. The spacer 400 is composed of an insulating material.

The spacer 400 can be formed, for example, by applying and drying a solution or dispersion liquid including a resin material and the like onto a surface of the separator 400 or any of the electrodes 100 and 200. The solvent or dispersion medium is not particularly limited, and for example, N-methyl-2-pyrrolidone (NMP) can be used. The spacer 400 can be formed by spraying particles into a desired shape onto a surface of the separator 300 or any of the electrodes 100 and 200. The spacer 400 can also be formed by applying and curing a curable resin into a desired shape onto the surface of the separator 300 or any of the electrodes 100 and 200. The cured product of the curable resin has a Young's modulus of, for example, 0.01 GPa or more and 10 GPa or less, and therefore makes it easier to relieve the stress caused by the expansion and contraction of the negative electrode, and the space accommodating the lithium metal can be easily maintained. Furthermore, by attaching an adhesive tape to the surface of the separator 300 or any of the electrodes 100 and 200, the spacer 400 can be formed. Preferably, of the above-described methods, the method using a solution or dispersion liquid including a resin material is used.

Examples of the resin material include fluorine-containing resin such as polyvinylidene fluoride (PVdF) and polytetrafluoroethylene; fluorine-containing rubber such as a vinylidene fluoride-tetrafluoroethylene copolymer and an ethylene-tetrafluoroethylene copolymer; rubbers such as a styrene-butadiene copolymer or a hydride thereof, an acrylonitrile-butadiene copolymer or a hydride thereof, an acrylonitrile-butadiene-styrene copolymer or a hydride thereof, a methacrylate-acrylate copolymer, a styrene-acrylate copolymer, an acrylonitrile-acrylate copolymer, ethylene propylene rubber, polyvinyl alcohol, and polyvinyl acetate; cellulose derivatives such as ethyl cellulose, methyl cellulose, hydroxyethyl cellulose, and carboxymethyl cellulose; acrylic resin such as an acrylic acid-methacrylic acid copolymer; polyphenylene ether, polysulfone, polyether sulfone, polyphenylene sulfide, polyether-imide, polyimide, polyamides such as wholly aromatic polyamides (aramid); polyimide, polyamide-imide, polyacrylonitrile, polyvinyl alcohol, polyether, polyacrylic acid, poly methacrylic acid, polyester, polyolefin, silicone resin, urethane resin, melamine resin, urea resin, and epoxy resin.

The spacer may be a composite including a resin material and particles. In this case, the resin material works to bind at least particles to each other. Such a spacer can be formed by using a dispersion liquid including a resin material and particles.

Examples of the particles include inorganic particles such as metal oxide, metal hydroxide, metal nitride, metal carbide, and metal sulfide having insulating properties. Examples of the metal oxide include aluminum oxide (alumina or boehmite), magnesium oxide, titanium oxide (titania), zirconium oxide, and silicon oxide (silica). For the metal hydroxide, aluminum hydroxide can be used. Examples of the metal nitride include silicon nitride, aluminum nitride, boron nitride, and titanium nitride. Examples of the metal carbide include silicon carbide, and boron carbide. Examples of the metal sulfide include barium sulfate. Furthermore, minerals such as alumino silicate, layered silicate, barium titanate, and strontium titanate can be used. In particular, alumina, silica, and titania are preferably used.

Preferably, the particles have an average particle size of, without particular limitation, for example, 10 μm or less, and more preferably 0.1 μm or more and 2.0 μm or less. The average particle size can be determined by photographing cross sections of the spacer in the secondary battery in the direction T with an electron microscope, specifying the particle portion C by image processing such as binarization of the photographed images, and determining as an average of a diameter of corresponding circle having the same area as the particles. The average is preferably determined from, for example, 100 or more particles.

In the composite including the resin material and particles, the particles are included by 70 parts by mass or more and 100 parts by mass or less relative to 100 parts by mass of the resin material. In this manner, the spacer strength can be sufficiently ensured, and suitable pores can be formed in the spacer easily, and the spacer porosity Psp can be easily controlled.

The spacer disposition is not particularly limited. Preferably, the spacer is disposed so that, for example, straight lines SL penetrating the spacer can be drawn along the direction D1 at 3 or more points (preferably 4 or more, even more preferably 5 or more positions) when seen in the direction T (normal direction to separator main surface). This suppresses non-uniform or dendritic lithium metal deposition on the negative electrode. Furthermore, it suppresses partial expansion of the negative electrode, and therefore electrode damages can be suppressed. In addition, the spacer supports the separator and the electrode with more structural supports, and the separator and the electrode receive stresses relatively equally from the spacer. Thus, damages to the electrode can be further suppressed. Furthermore, the pressure can be given more equally to the deposited lithium metal entirely from the separator. Thus, the direction of lithium metal deposition can be controlled easily to the surface direction of the negative electrode even more.

When seen from the direction T, in the straight line SL, the ratio of the minimum distance d (μm) of adjacent spacers and the spacer height h (μm): d/h is, for example 10 or more and 800 or less, or 40 or more and 400 or less. By controlling the d/h ratio to the above-described range, sufficient space to accommodate lithium metal can be easily secured. Furthermore, the pressure can be given uniformly from the separator to the entire deposited lithium metal. The minimum distance d between adjacent spacers can be determined by measuring the distance one by one among any 10 straight lines SL, and averaging them.

The spacer can be a plurality of lines of bump portions disposed in stripes on the electrode or separator surface, for example, so as to cross the direction D1. For example, the bump portion can be provided at both ends in the direction D1 on the separator surface along the long side direction (hereinafter, direction D2) of the separator, and one or more bump portions can be provided between the both ends along the direction D2. In this case, the straight line SL can be drawn so as to pass through the spacer at three or more portions, i.e., two at both ends, and one or more between the both ends. The spacer composed of such a plurality of lines of bump portions can be formed relatively easily on the separator or electrode surface. Also, the parameters such as the height h and d/h ratio can be easily controlled.

[Lithium Secondary Battery]

In the following, the configuration of the lithium secondary battery of the present disclosure is described with reference to the drawings, with a cylindrical battery including a wound type electrode group as an example. However, the present disclosure is not limited to the configuration below.

Figure 2:
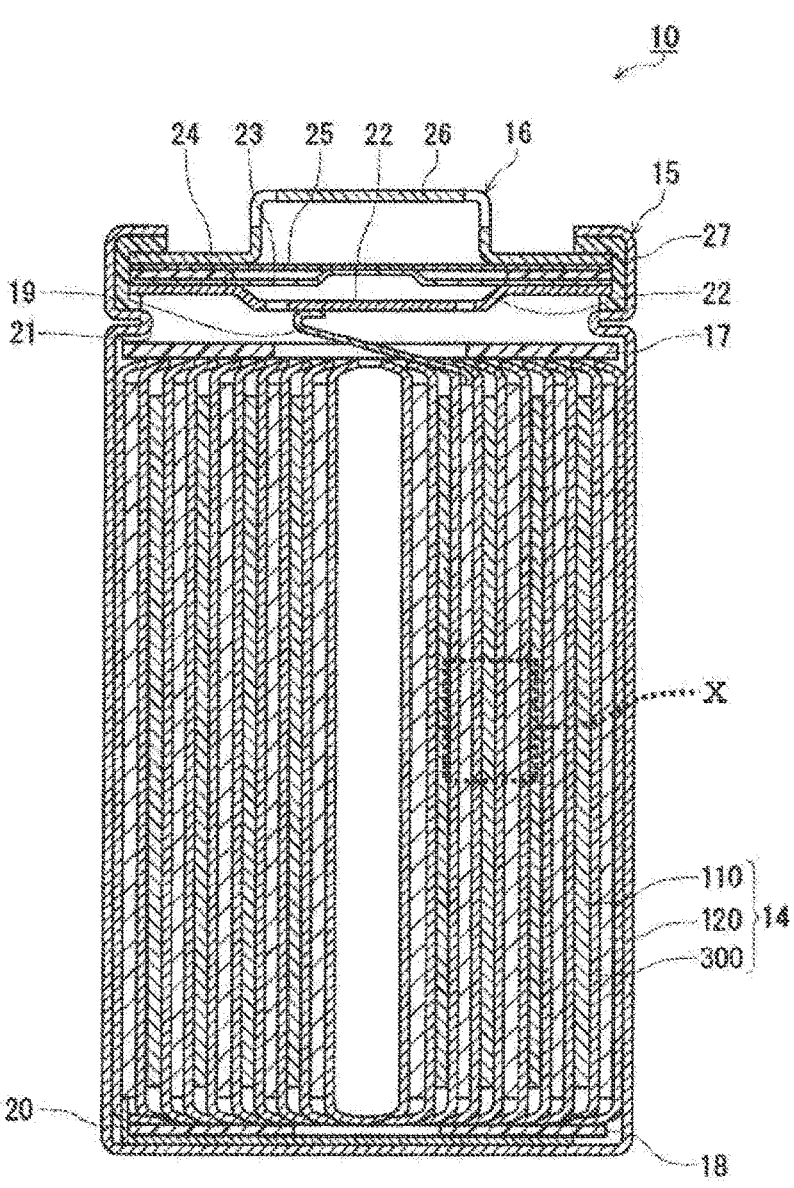
FIG. 2 is a vertical cross sectional view schematically showing a lithium secondary battery of an embodiment of the present disclosure.

FIG. 2 is a vertical cross sectional view of a lithium secondary battery 10. The lithium secondary battery 10 is a cylindrical battery including a cylindrical battery case, a wound electrode group 14 accommodated in the battery case, and a non-aqueous electrolyte. The battery case is composed of a case main body 15 of a bottomed cylindrical metal-made vessel, and a seal 16 that seals the opening of the case main body 15. The case main body 15 has a ring step portion 21 near the opening formed by pressing the side wall partially from outside. The seal 16 is supported by the opening-side surface of the step portion 21. A gasket 27 is disposed between the case main body 15 and the seal 16, which ensures air tightness in the battery case. In the case main body 15, insulating plates 17 and 18 are disposed at both ends in the winding axis direction of the electrode group 14.

The seal 16 includes a filter 22, lower valve 23, insulating member 24, upper valve 25, and cap 26. The cap 26 is disposed outside the case main body 15, and the filter 22 is disposed inside the case main body 15. The lower valve 23 and upper valve 25 are connected to each other at their center portion, and an insulating member 24 is interposed therebetween at their peripheral end portion. The filter 22 and the lower valve 23 are connected to each other at their peripheral end portion. The upper valve 25 and the cap 26 are connected at their peripheral end portion. Air holes are formed in the lower valve 23. When the internal pressure in the battery case increases by, for example, abnormal heat generation, the upper valve 25 bulges toward the cap 26 side to be spaced apart from the lower valve 23. In this manner, electrical connections between the lower valve 23 and the upper valve 25 are shut. Further increase in the internal pressure causes the upper valve 25 to break, which causes gas to release from the opening formed in the cap 26.

Here, the electrode group 14 is composed of a positive electrode 110, negative electrode (negative electrode current collector) 120, and separator 300. The positive electrode 110, negative electrode 120, and separator 300 interposed therebetween are all in a strip shape, and are wound into a spiral shape so that their width directions are in parallel with the winding axis.

The positive electrode 110 is electrically connected to a cap 26 also serving as a positive electrode terminal through a positive electrode lead 19. An end of the positive electrode lead 19 is connected, for example, to near the center in the longitudinal direction of the positive electrode 110. The other end of the positive electrode lead 19 drawn from the positive electrode 110 is welded to the internal face of the filter 22 via through holes formed in the insulating plates 17.

The negative electrode 120 is electrically connected to the case main body 15 also serving as a negative electrode terminal through the negative electrode lead 20. One end of the negative electrode lead 20 is welded to, for example, an end portion in the longitudinal direction of the negative electrode 120, and the other end is welded to the internal bottom face of the case main body 15.

Figure 3:
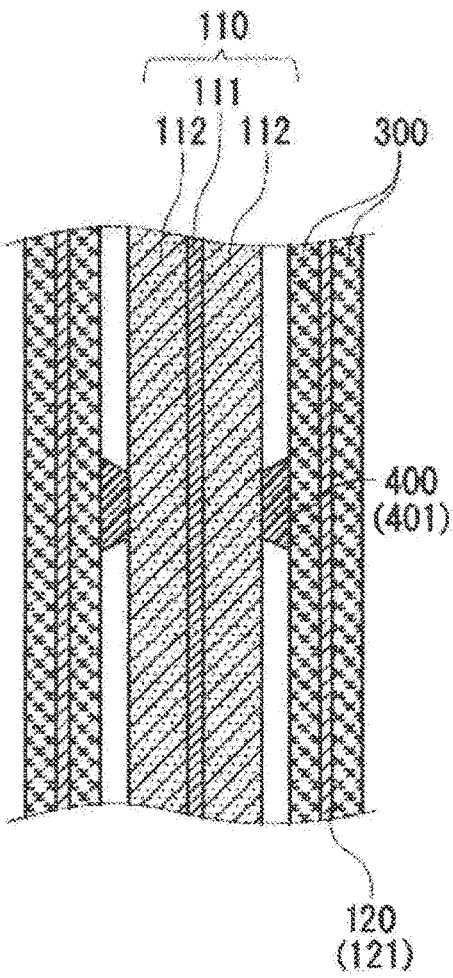
FIG. 3 is an enlarged view schematically showing an important portion of the lithium secondary battery of FIG. 2.

FIG. 3 is an enlarged view schematically showing the region X shown with broken lines in FIG. 2 in a discharged state. In the example shown in the figure, the spacer 400 has a trapezoid cross section. However, the embodiment of the present disclosure is not limited thereto, and for example, it can be rectangular, rectangular with at least one curved corner, ellipse, and partially ellipse. In the example shown in the figure, the spacer 400 is provided between the positive electrode 110 and the separator 300. However, the embodiment of the present disclosure is not limited thereto, and for example, the spacer 400 can be provided between the negative electrode 120 and the separator 300, or between the positive electrode 110 and the negative electrode 120 and the separator 300.

The positive electrode 110 includes a positive electrode current collector 111 and a positive electrode mixture layer 112. Between the positive electrode mixture layer 112 and the separator 300, a spacer 400 is provided. The spacer 400 is composed of lines of bump portion 401 provided along the direction D2 (long side direction) of the separator 300. In a discharged state, lithium metal is not deposited on the negative electrode current collector 121 surface, and a space is kept between the positive electrode 110 and the separator 300. Meanwhile, in a charged state, lithium metal is deposited on the negative electrode current collector 121 surface, and accommodated in the space between the positive electrode 110 and the separator 300 while receiving pressure from the separator 300. That is, the negative electrode 120 includes the negative electrode current collector 121 in a discharged state, and includes the negative electrode current collector 121 and lithium metal deposited on its surface in a charged state.

Lithium metal is accommodated in the space between the positive electrode 110 and the separator 300, and therefore the changes in the apparent volume of the electrode group involved with the lithium metal deposition during charge/discharge cycles are decreased. Thus, stresses applied to the negative electrode current collector 121 are also suppressed.

Also, pressures are applied to the lithium metal accommodated between the positive electrode 110 and the separator 300 from the separator 300, and therefore the deposition state of lithium metal is controlled, and lithium metal is hardly isolated, suppressing decrease in charge/discharge efficiency.

In the example shown in the figure, a cylindrical lithium secondary battery including a wound electrode group is described; however, the shape of the lithium secondary battery is not limited thereto, and can be selected suitably from various shapes such as cylindrical, coin, prism, sheet, flat, etc. according to its application. The form of the electrode group is not particularly limited as well, and it can be a layered type. In the lithium secondary battery, for components other than the electrode group and the non-aqueous electrolyte, known ones can be used without particular limitation.

Next, description is given below of the spacer disposition with reference to figures. In the example shown in the figure, the spacer is provided on the separator surface. However, the embodiment of the present disclosure is not limited thereto, and the spacer can be provided on the electrode surface.

Figure 4:
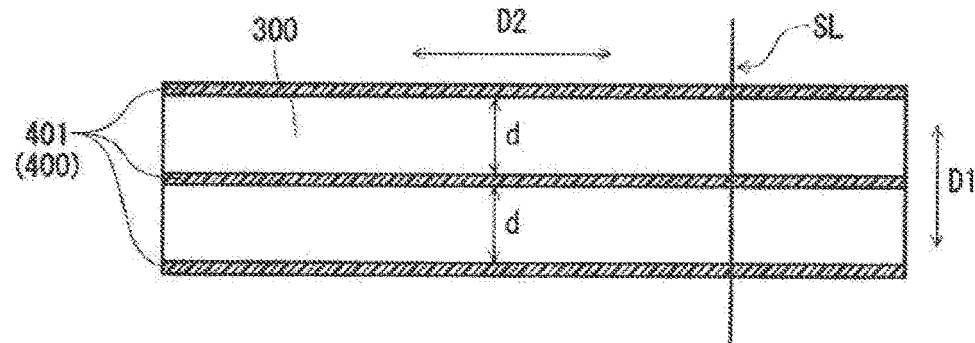
FIG. 4 is a plan view schematically showing a spacer disposed on a separator surface.

FIG. 4 is a plan view schematically showing a spacer disposed on a separator surface. The spacer 400 includes lined bump portions 401 along the direction D2 provided at both ends in the surface direction D1 of the separator 300, and a lined bump portion 401 along the direction D2 provided at a center between the both ends. That is, the spacer 400 is composed of substantially parallel lined bump portions 401 of a total of three. Thus, the straight line SL drawn along the direction D1 passes through the spacer 400 at three points. Substantially parallel means generally parallel, and the lined bump portions 401 may cross each other with an angle of, for example, 0° to 20°, or 0° to 10°.

Figure 5:
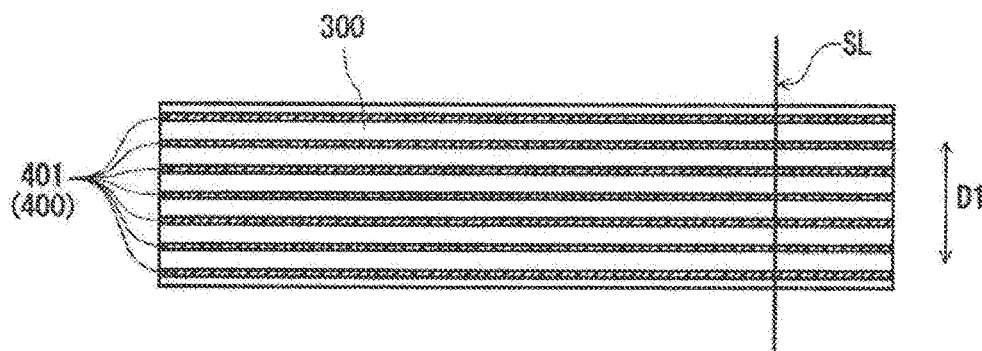
FIG. 5 is a plan view schematically showing another spacer disposed on a separator surface.

FIG. 5 is a plan view schematically showing another spacer disposed on a separator surface. The spacer 400 is composed of a plurality of lined bump portions 401 disposed in stripes along the direction D2 on the separator 300 surface. In this case, the straight lines SL can be drawn along the direction D1 so as to pass through the number of points the same as the lined bump portions 401 (in the figure shown, 7 points).

Figure 6:
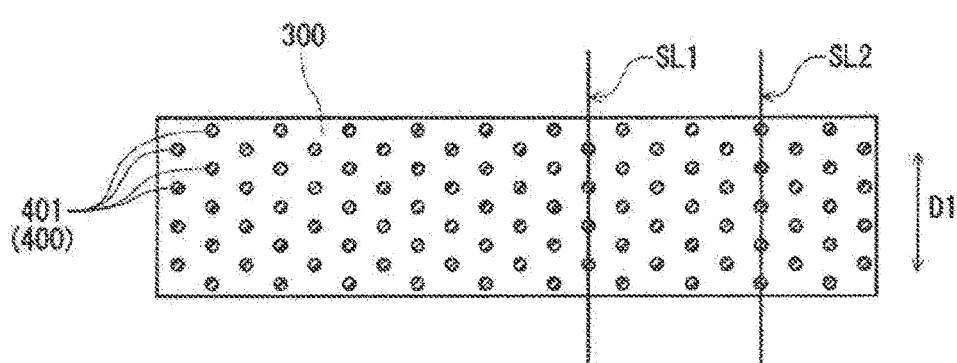
FIG. 6 is a plan view schematically showing still another spacer disposed on a separator surface.

FIG. 6 is a plan view schematically showing still another spacer disposed on a separator surface. The spacer 400 is composed of a plurality of spotted bump portions 401 distributed equally on the separator 300 surface. In the example shown in the figure, when the straight line SL is drawn along the direction D1, the number of the spotted bump portion 401 passing through changes depending on the position of the straight line SL. The straight line SL1 passes four bump portions 401, and the straight line SL2 passes through five bump portions 401. In such a case, of the plurality of straight lines SL that can be drawn in different embodiments, three or more bump portions passed through by at least one straight line SL will suffice.

Figure 7:
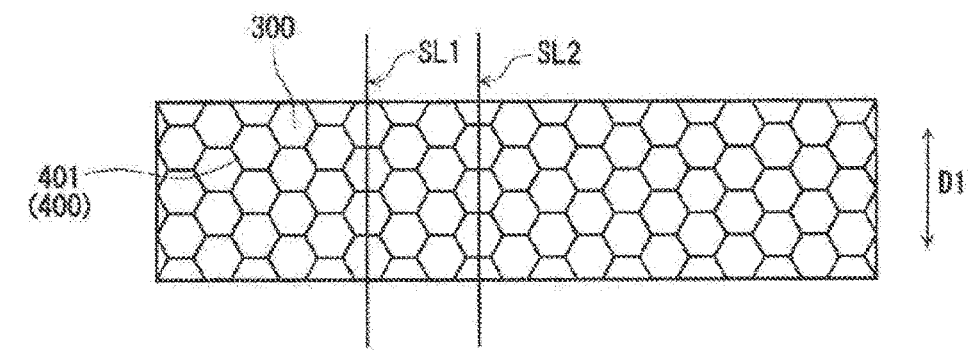
FIG. 7 is a plan view schematically showing still another spacer disposed on a separator surface.

FIG. 7 is a plan view schematically showing still another spacer disposed on a separator surface. The spacer 400 is continuous honeycomb ribs disposed on the surface of the separator 300 so as to spread equally. In this case as well, the number of ribs to be passed through differ depending on the position of the straight line SL when the straight line SL is drawn along the direction D1. The straight line SL1 passes through the rib at 5 points, and the straight line SL2 passes through the rib at 4 points.

Figure 8:
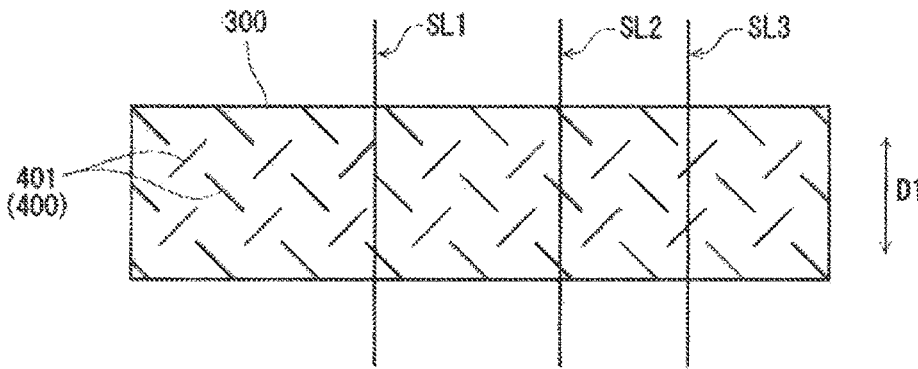
FIG. 8 is a plan view schematically showing still another spacer disposed on a separator surface.

FIG. 8 is a plan view schematically showing still another spacer disposed on a separator surface. The spacer 400 is composed of bump portions 401 of a plurality of line segments disposed on the surface of the separator 300 so as to spread equally. The bump portions 401 of line segments are disposed so as to cross each other along the direction D1. In this case as well, when a straight line is drawn along the direction D1, the number of bump portions 401 of line segments passing through differs depending on the position of the straight line SL. For example, the straight line SL1 passes through 3 or 4 bump portions 401, and the straight line SL2 passes through 3 bump portions 401, and the straight line SL3 passes through two bump portions 401.

In the following, components of the lithium secondary battery are described in more detail.

[Negative Electrode]

The negative electrode includes a negative electrode current collector. In lithium secondary batteries, lithium metal deposits on the surface of the negative electrode by charging. More specifically, lithium ions contained in the non-aqueous electrolyte receive electrons in the negative electrode by charging to be a lithium metal, and deposit on the negative electrode surface. The lithium metal deposited on the negative electrode surface dissolves into the non-aqueous electrolyte as lithium ions by discharging. The lithium ion contained in the non-aqueous electrolyte may be derived from the lithium salt added to the non-aqueous electrolyte, or may be supplied from the positive electrode active material by charging, or it can be both of them.

The negative electrode may include a lithium ion storage layer (layer that exhibits a capacity by storing and releasing of lithium ions by negative electrode active material (graphite, etc.)) supported by the negative electrode current collector. In this case, a fully charged negative electrode may have an open circuit potential relative to lithium metal (lithium dissolution and deposition potential) of 70 mV or less. When the fully charged negative electrode has an open circuit potential relative to lithium metal of 70 mV or less, lithium metal is present on the surface of a fully charged lithium ion storage layer. That is, the negative electrode exhibits a capacity by lithium metal deposition and dissolution.

Here, fully charged means, when a battery rated capacity is set to C, for example, a state in which a battery is charged until a charged state of 0.98×C or more. A fully charged negative electrode open circuit potential can be measured by disassembling a fully charged battery under an argon atmosphere to take out the negative electrode, and assembling a cell with lithium metal as a counter electrode. The non-aqueous electrolyte of the cell may have the same composition as that of the non-aqueous electrolyte in the disassembled battery.

The lithium ion storage layer is formed from a negative electrode mixture containing a negative electrode active material into a layer. The negative electrode mixture may include, other than the negative electrode active material, a binder, a thickener, a conductive material, and the like.

Examples of the negative electrode active material include a carbon material, a Si-containing material, and a Sn-containing material. The negative electrode may include one type of negative electrode active material, or two or more can be used in combination. Examples of the carbon material include graphite, graphitizable carbon (soft carbon), and non-graphitizable carbon (hard carbon).

The conductive material is, for example, a carbon material. Examples of the carbon material include carbon black, acetylene black, Ketjen Black, carbon nanotube, and graphite.

Examples of the binder include fluororesin, polyacrylonitrile, polyimide resin, acrylic resin, polyolefin resin, and rubber-based polymer. Examples of the fluororesin include polytetrafluoroethylene and polyvinylidene fluoride.

A negative electrode current collector of a conductive sheet will suffice. Examples of the conductive sheet include foil and film.

The material of the negative electrode current collector (conductive sheet) can be a conductive material other than lithium metal and lithium alloy. The conductive material is a metal, and a metal material such as alloy. Preferably, the conductive material is a material that does not react with lithium. More specifically, a material that does not form an alloy or an intermetallic compound with lithium is preferable. For such a conductive material, for example, copper (Cu), nickel (Ni), iron (Fe), and an alloy including these metal elements, or graphite with its basal plane exposed with priority is used. Examples of the alloy include copper alloy and stainless steel (SUS). Preferably, copper and/or a copper alloy having a high conductivity among these is used.

The negative electrode current collector thickness is not particularly limited, and for example, 5 μm or more and 300 μm or less.

[Positive Electrode]

The positive electrode includes, for example, a positive electrode current collector, and a positive electrode mixture layer supported on the positive electrode current collector. The positive electrode mixture layer includes, for example, a positive electrode active material, a conductive material, and a binder. The positive electrode mixture layer may be formed on one side of the positive electrode current collector, or may be formed on both sides thereof. The positive electrode is produced by, for example, applying a positive electrode mixture slurry on both sides of the positive electrode current collector, drying the coating, and rolling: the positive electrode mixture slurry including a positive electrode active material, a conductive material, and a binder.

The positive electrode active material is a material that stores and releases lithium ions. Examples of the positive electrode active material include a lithium-containing transition metal oxide, transition metal fluoride, polyanion, fluorinated polyanion, and transition metal sulfide. In particular, in view of low production costs, and a high average discharge voltage, a lithium-containing transition metal oxide is preferable.

Lithium contained in the lithium-containing transition metal oxide is released from the positive electrode as lithium ions during charging, and deposits as lithium metal on the negative electrode or negative electrode current collector. During discharging, lithium metal dissolves from the negative electrode to release lithium ions, and is stored by the composite oxide of the positive electrode. That is, lithium ion involved with charge/discharge is derived generally from the solute in the non-aqueous electrolyte and the positive electrode active material.

Examples of the transition metal element included in the lithium-containing transition metal oxide include Se, Ti, V, Cr, Mn, Fe, Co, Ni, Cu, Y, Zr, and W. The lithium-containing transition metal oxide may contain one kind of transition metal element, or two or more thereof. The transition metal element may be Co, Ni, and/or Mn. The lithium-containing transition metal oxide may contain, as necessary, one or more main group elements. Examples of the main group element include Mg, Al, Ca, Zn, Ga, Ge, Sn, Sb, Pb, and Bi. The main group element may be Al and the like.

Of the lithium-containing transition metal oxide, a composite oxide containing Co, Ni, and/or Mn as a transition metal element, with or without Al as an optional component, and having a layered rock salt type crystal structure is preferable in particular, in terms of achieving a high capacity. In this case, in lithium secondary batteries, a molar ratio: mLi/mM of a total lithium amount mLi of the positive electrode and negative electrode to the amount of metal other than lithium mM of the positive electrode is set to, for example, 1.1 or less.

For the binder and conductive material, for example, those exemplified for the negative electrode can be used. The shape and thickness of the positive electrode current collector can be selected from the shape and range for the positive electrode current collector.

Examples of the positive electrode current collector (conductive sheet) material include a metal material including Al, Ti, and Fe. The metal material includes Al, Al alloy, Ti, Ti alloy, and Fe alloy. The Fe alloy is stainless steel (SUS).

The positive electrode current collector thickness is not particularly limited, and for example, 5 μm or more and 300 μm or less.

[Separator]

For the separator, a porous sheet having ion permeability and insulating properties is used. Examples of the porous sheet include a microporous thin film, woven cloth, and nonwoven cloth. The separator material is not particularly limited, and may be a polymer material. Examples of the polymer material include olefin resin, polyamide resin, and cellulose. Examples of the olefin resin include polyethylene, polypropylene, and a copolymer of ethylene and propylene. The separator may include, as necessary, additives. Examples of the additive include inorganic filler.

Preferably, the thickness of the separator is not particularly limited, and for example, 5 pun or more and 20 μm or less, and more preferably 10 μm or more and 20 μm or less.

[Non-Aqueous Electrolyte]

A non-aqueous electrolyte having lithium ion conductivity includes, for example, a non-aqueous solvent, lithium ions dissolved in the non-aqueous solvent, and anions. The non-aqueous electrolyte may be in a liquid state or a gel state.

The liquid non-aqueous electrolyte is prepared by dissolving a lithium salt in the non-aqueous solvent. By allowing a lithium salt to be dissolved in the non-aqueous solvent, lithium ions and anions are generated.

The gel non-aqueous electrolyte includes a lithium salt and a matrix polymer, or a lithium salt, non-aqueous solvent, and matrix polymer. For the matrix polymer, for example, a polymer material that absorbs the non-aqueous solvent to be gelled is used. Examples of the polymer material include fluorine resin, acrylic resin, and polyether resin.

Examples of the lithium salt or anion include those known ones used for non-aqueous electrolytes of lithium secondary batteries. Specifically, $BF_4—$, $ClO_4—$, $PF_6—$, $CF_3SO_3—$, $CF_3CO_2—$, anion of imides, and anion of an oxalate complex are used. Examples of the anion of imides include N $(SO_2CF_3)_2—$, N $(C_mF_{2m+1}SO_2)_x$ $(C_nF_{2n+1}SO_2)_y^-$ (m and n are each independently an integer of 0 or 1 or more, x and y are each independently 0, 1, or 2, and x+y=2 is satisfied). The anion of an oxalate complex may contain boron and/or phosphorus. Examples of the anion of an oxalate complex include bis oxalateborate anion, $BF_2(C_2O_4)^-$, $PF_4(C_2O_4)^-$, and $PF_2(C_2O_4)_2—$. The non-aqueous electrolyte may include these anions singly, or two or more thereof may be included.

In view of suppressing lithium metal to be deposited as dendrites, the non-aqueous electrolyte preferably includes at least anion of an oxalate complex, and in particular an oxalate complex anion having fluorine is preferable. The interaction between the oxalate complex anion having fluorine and lithium allows for lithium metal to deposit as fine particles uniformly. Therefore, localized lithium metal deposition can be suppressed easily. The oxalate complex anion including fluorine can be combined with other anions. Other anions are anions of $PF_6—$ and/or imides.

Examples of the non-aqueous solvent include ester, ether, nitrile, amide, and halogen replaced substances of these. The non-aqueous electrolyte may include these non-aqueous solvents singly, or two or more may be included. Examples of the halogen replaced substances include fluorides.

Examples of the ester include carbonate and carboxylate. Examples of the cyclic carbonate include ethylene carbonate, propylene carbonate, and fluoroethylene carbonate (FEC). Examples of the chain carbonate include dimethyl carbonate (DMC), ethyl methyl carbonate (EMC), and diethyl carbonate. Examples of the cyclic carboxylate include γ-butyrolactone and γ-valerolactone. Examples of the chain carboxylate include ethyl acetate, methyl propionate, and methyl fluoro propionate.

Examples of the ether include cyclic ether and chain ether. Examples of the cyclic ether include 1,3-dioxolane, 4-methyl-1,3-dioxolane, tetrahydrofuran, and 2-methyl tetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethylether.

Preferably, the lithium salt concentration of the non-aqueous electrolyte is, for example, 0.5 mol/L or more and 3.5 mol/L or less. The non-aqueous electrolyte may have an anion concentration of 0.5 mol/L or more and 3.5 mol/L or less. The non-aqueous electrolyte may have an oxalate complex anion concentration of 0.05 mol/L or more and 1 mol/L or less.

The non-aqueous electrolyte may include additives. The additive may be an additive that forms a coating on the negative electrode. A coating derived from the additive formed on the negative electrode suppresses dendrite production easily. Examples of such additives include vinylene carbonate, FEC, and vinyl ethyl carbonate (VEC).

EXAMPLES

In the following, the lithium secondary battery of the present disclosure is described in more detail based on Examples and Comparative Examples. However, the present disclosure is not limited to Examples below.

Example 1

(1) Production of Positive Electrode

A layered rock salt type lithium-containing transition metal oxide (NCA: positive electrode active material) containing Li, Ni, Co, and Al (molar ratio of Li relative to a total of Ni, Co, and Al is 1.0), acetylene black (AB; conductive material), and polyvinylidene fluoride (PVdF; binder) were mixed at a mass ratio of NCA:AB:PVdF=95:2.5:2.5, and a suitable amount of N-methyl-2-pyrrolidone (NMP) was added and mixed, thereby preparing a positive electrode mixture slurry. The obtained positive electrode mixture slurry was applied to both surfaces of a strip of Al foil (positive electrode current collector), and then dried, and a roller was used to roll the coating of the positive electrode mixture. Lastly, a laminate of the obtained positive electrode current collector and the positive electrode mixture was cut into a predetermined electrode size, thereby producing a positive electrode having positive electrode mixture layers on both sides of the positive electrode current collector.

(2) Formation of Spacer 10 parts by mass of polyvinylidene fluoride (PVdF) as a resin material, 90 parts by mass of alumina (including alumina with average particle size of 1 μm and alumina with average particle size of 0.1 μm at a mass ratio of 10/1) as inorganic particles, and N-methyl-2-pyrrolidone (NMP) as a dispersion medium were mixed, thereby preparing a spacer ink. Also, a polyethylene made separator (microporous film) having a thickness of 20 μm, and a porosity Pse of 40% was prepared.

The spacer ink was applied to both sides of the separator surface along the direction D2, at both ends in the direction D1 and at a center between the both ends; and thereafter, dried with hot air, thereby providing a spacer of a total of three lined bump portions parallel to each other. The spacer ink was applied using a dispenser. The spacer bump portion had a width of 1 mm, a height t of 30 μm, and a porosity Psp of 2%. Thus, the Psp/Pse ratio R was 0.05.

In the direction D1, adjacent bump portions had a minimum distance d therebetween of 9 mm, and the ratio of the first region area relative to a total area of the first region and the second region (SR) was about 14%.

(3) Production of Negative Electrode

A strip of electrolytic copper foil (thickness 15 μm) was prepared as a negative electrode current collector.

(4) Preparation of Non-Aqueous Electrolyte

Ethylene carbonate (EC) and dimethyl carbonate (DMC) were mixed at a volume ratio of EC:DMC=30:70, and to the obtained solvent mixture, $LiPF_6$ was dissolved at a concentration of 1 mol/L, and $LiBF_2(C_2O_4)$ was dissolved at a concentration of 0.1 mol/L, thereby preparing a liquid non-aqueous electrolyte.

(5) Assembly of Battery

The positive electrode and the negative electrode current collector were wound spirally with a separator described above interposed therebetween in an inert gas atmosphere, thereby producing an electrode group. Lithium contained in the electrode group was all derived from the positive electrode, and therefore the molar ratio: mLi/mM of the total amount of lithium mLi and the amount of metal M mM contained in the positive electrode (here, Ni, Co, and Al) was 1.0.

The electrode group was accommodated in a bag of outer case formed from a laminate sheet having an Al layer, then the above-described non-aqueous electrolyte was injected, and the outer case was sealed, thereby producing a lithium secondary battery A1.

In a reference line obtained by cutting the electrode group, the bump portion had a cross sectional shape like a trapezoid.

Example 2

A lithium secondary battery A2 was produced in the same manner as in Example 1, except that 10 parts by mass of polyvinylidene fluoride (PVdF), 90 parts by mass of alumina (average particle size 1 μm), and N-methyl-2-pyrrolidone (NMP) as a dispersion medium were mixed to prepare a spacer ink, the spacer porosity Psp was changed to 11%, and the Psp/Pse ratio R was changed to 0.28.

Example 3

A lithium secondary battery A3 was produced in the same manner as in Example 1, except that 10 parts by mass of polyvinylidene fluoride (PVdF), 90 parts by mass of alumina (average particle size 5 μm), and N-methyl-2-pyrrolidone (NMP) as a dispersion medium were mixed to prepare a spacer ink, the spacer porosity Psp was changed to 29.5%, and the Psp/Pse ratio R was changed to 0.74.

Example 4

A lithium secondary battery A4 was produced in the same manner as in Example 1, except that 10 parts by mass of polyvinylidene fluoride (PVdF), 90 parts by mass of alumina (average particle size 10 μm), and N-methyl-2-pyrrolidone (NMP) as a dispersion medium were mixed to prepare a spacer ink, the spacer porosity Psp was changed to 39%, and the Psp/Pse ratio R was changed to 0.97.

Comparative Example 1

A lithium secondary battery B1 was produced in the same manner as in Example 1, except that 30 parts by mass of polyvinylidene fluoride (PVdF), 70 parts by mass of alumina (average particle size 1 μm), and N-methyl-2-pyrrolidone (NMP) as a dispersion medium were mixed to prepare a spacer ink, the spacer porosity Psp was changed to 60%, and the Psp/Pse ratio R was changed to 1.5.

Comparative Example 2

A lithium secondary battery B2 was produced in the same manner as in Example 2, except that the height of the spacer bump portion was changed to 15 μm. The spacer porosity Psp was 9.6%, and the Psp/Pse ratio R was 0.24.

[Evaluation 1]

The obtained batteries were evaluated by performing a charge/discharge test. The results are shown in Table 1.

In the charge/discharge test, a cycle as follows was repeated to 100 times: in one cycle, three batteries were charged in a thermostatic chamber of 25° C. under the conditions below, and allowed to stand for 20 minutes, and discharged under the conditions below. The ratio of the discharge capacity at the 50th cycle relative to the discharge capacity at the 1st cycle (MR50) was determined as a capacity retention rate (%).

(Charge)

Constant current charging was performed at a current of 10 mA per electrode unit area (square centimeter) until the battery voltage reached 4.3 V, and thereafter, constant voltage charging was performed at a voltage of 4.3 V until the electric current value per unit area of the electrode reached 1 mA.

(Discharge)

Constant current discharging was performed at a current per electrode unit area of 10 mA until the battery voltage reached 3.0 V.

For the three batteries, the number of cycles when the cycle stopped probably because the negative electrode current collector (copper foil) cracked was determined. In the case when some of the batteries stopped the cycle, the average value of MR50 of the remaining batteries was determined.

TABLE 1

| | Height t(μm) | R(Psp/Pse) | MR50 | Copper foil cracks |
|---|---|---|---|---|
| A1 | 30 | 0.05 | 82 | No |
| A2 | 30 | 0.28 | 64 | No |

TABLE 1-continued

|  | Height t(μm) | R(Psp/Pse) | MR50 | Copper foil cracks |
|---|---|---|---|---|
| A3 | 30 | 0.74 | 60 | No |
| A4 | 30 | 0.97 | 55 | No |
| B1 | 30 | 1.5 | 46 | Yes |
| B2 | 15 | 0.24 | Did not reach 50th Cycle | Yes |

In the batteries A5 and B1, the cycle stoppage occurred due to the negative electrode current collector cracks. In the battery B1, the capacity retention rate at the 50th cycle was significantly low. In the batteries A1, A2, A3, and A4, in which the ratio R satisfied 0<R<0.75, particularly excellent MR50 was achieved.

Example 5

A lithium secondary battery A5 was produced in the same manner as in Example 2, except that the spacer bump portion was changed to a total of 6. Specifically, a spacer of lined bump portions parallel to each other was provided on both surfaces of the separator, at both ends in the direction D1, and four between the both ends (6 in total). The ratio of the first region area relative to a total area of the first region and the second region SR was about 28%.

Example 6

A lithium secondary battery A6 was produced in the same manner as in Example 2, except that the spacer bump portion width was changed to 2 mm. The ratio of the first region area relative to a total area of the first region and the second region SR was about 28%.

Example 7

A lithium secondary battery A7 was produced in the same manner as in Example 2, except that the spacer bump portions were a total of 6 with the same arrangement as in Examples, and the spacer bump portion width was changed to 2 mm. The ratio of the first region area relative to a total area of the first region and the second region SR was about 56%.

[Evaluation 2]

The obtained batteries were evaluated in the same manner as described above. Table 2 shows the results.

TABLE 2

|  | SR(%) | R(Psp/Pse) | MR50 | Copper foil cracks |
|---|---|---|---|---|
| A2 | 14 | 0.05 | 64 | No |
| A5 | 28 | 0.05 | 62 | No |
| A6 | 28 | 0.05 | 60 | No |
| A7 | 56 | 0.05 | 56 | No |

Table 2 shows that the ratio of the first region area relative to a total area of the first region and the second region SR was preferably 30% or less, and more preferably 20% or less. To form a sufficiently strong spacer, a suitable bump portion width is necessary, and the SR of 5% or more was necessary.

INDUSTRIAL APPLICABILITY

The lithium secondary battery of the present disclosure can be used for electronic devices such as mobile phones, smartphones, and tablet terminals, electric vehicles including hybrid vehicles, and plug-in hybrid vehicles, and a household power storage in combination with solar batteries.

REFERENCE SIGNS LIST

10 Lithium Secondary Battery
14 Electrode Group
15 Case Main Body
16 Seal
17,18 Insulating Plates
19 Positive Electrode Lead
20 Negative Electrode Lead
21 Step Portion
22 Filter
23 Lower Valve
24 Insulating Member
25 Upper Valve
26 Cap
27 Gasket
100 First Electrode
110 Positive Electrode
111 Positive Electrode Current Collector
112 Positive Electrode Mixture Layer
120 Negative Electrode
121 Negative Electrode Current Collector
200 Second Electrode
300 Separator
400 Spacer
401 Bump Portion

The invention claimed is:

1. A lithium secondary battery comprising a positive electrode, a negative electrode, a porous separator disposed between the positive electrode and the negative electrode, a spacer disposed between the separator and at least one of the positive electrode and the negative electrode, and a non-aqueous electrolyte having lithium ion conductivity, wherein in the negative electrode, lithium metal deposits during charging, and the lithium metal dissolves during discharging, a first region facing the spacer, and a second region not facing the spacer are included in a region of the negative electrode that faces the positive electrode, the spacer is porous, the spacer has a height of 20 μm or more, the spacer is a composite including a resin material and particles, and a ratio R of a porosity Psp of the spacer and a porosity Pse of the separator: Psp/Pse satisfies 0<R<0.3.

2. The lithium secondary battery of claim 1, wherein the ratio R of the porosity Psp of the spacer and the porosity Pse of the separator: Psp/Pse satisfies 0<R<0.05.

3. The lithium secondary battery of claim 1, wherein a ratio of an area of the first region to a total area of the first region and the second region is 5 to 30%.

* * * * *